United States Patent [19]
Miller

[11] Patent Number: 5,564,306
[45] Date of Patent: Oct. 15, 1996

[54] DENSITY COMPENSATED GAS FLOW METER

[75] Inventor: Charles E. Miller, Boulder, Colo.

[73] Assignee: Marcum Fuel Systems, Inc., Denver, Colo.

[21] Appl. No.: 248,689

[22] Filed: May 25, 1994

[51] Int. Cl.⁶ .................................................. G01F 1/68
[52] U.S. Cl. ...................... 73/861; 73/861.01; 73/23.2
[58] Field of Search ........................... 73/861, 861.01, 73/861.64, 23.2, 25.01, 25.03, 25.05

[56] References Cited

U.S. PATENT DOCUMENTS

| | | | |
|---|---|---|---|
| 1,208,494 | 12/1916 | Connet | 73/861.01 |
| 2,183,374 | 12/1939 | Walker | 73/861.01 |
| 3,073,158 | 1/1963 | Knauth | 73/861.01 |
| 3,799,218 | 3/1974 | Douglass | 141/18 |
| 3,837,377 | 9/1974 | McJones | 141/4 |
| 3,875,955 | 4/1975 | Gallatin et al. | 137/14 |
| 4,153,083 | 5/1979 | Imler et al. | 141/4 |
| 4,483,376 | 11/1984 | Bresie et al. | 141/95 |
| 4,527,600 | 7/1985 | Fisher et al. | 141/4 |
| 4,582,100 | 4/1986 | Poulsen | 141/4 |
| 4,813,461 | 3/1989 | Fanshawe et al. | 141/4 |
| 4,966,206 | 10/1990 | Baumann et al. | 141/83 |
| 5,029,622 | 7/1991 | Mutter | 141/4 |

Primary Examiner—Richard Chilcot
Assistant Examiner—Harshad Patel
Attorney, Agent, or Firm—James R. Young; Chrisman, Bynum & Johnson, P.C.

[57] ABSTRACT

A mass flow meter for a gas dispenser includes apparatus and method for determining specific heat ratio of the gas as a function of two pressure measurements in relation to a nozzle and for determining mass flow rate as a function of the specific heat ratio, the two pressure measurements in relation to the nozzle, and a density measurement of the gas.

28 Claims, 6 Drawing Sheets

DENSITY COMPENSATED GAS FLOW METER

BACKGROUND OF THE INVENTION

1. Field of the Invention

This invention relates generally to gas flow meters, and more particularly to a method and apparatus for dispensing and measuring natural gas into vehicle tanks.

2. State of the Prior Art

Dispensing gaseous fuels, such as compressed natural gas, into motor vehicle tanks at the consumer retail point of sale presents problems that are either not encountered or not significant in the more conventional liquid fuel distribution and retail sales apparatus and systems. For example, natural gas is transferred and stored under high pressure, which, according to the ideal gas law, varies as a function of temperature, and which requires special fittings, tanks, and safety considerations that are more complex than liquid fuel handling equipment and components. Also, measuring the quantity of a gas being dispensed at the point of sale into a customer's motor vehicle tank is not as easy as measuring a liquid fuel.

Tanks for storing compressed natural gas aboard vehicles are manufactured to withstand pressures within normal ranges, such as 3,000 to 4,000 p.s.i.g., with an extra safety margin. Because gas pressure varies as a function of temperature, and because the temperature of a fuel tank on a motor vehicle cannot be controlled easily or reliably the tank manufacturers rate their tanks for a maximum safe operating pressure at a convenient and normal "standard temperature", usually 70° F. (19° C.). For example, a tank rated at 3,000 p.s.i.g. at 70° F. (19° C.) is designed to withstand safely whatever pressure that amount of gas will exert at whatever higher temperatures it would likely encounter in extreme environments. According to the ideal gas law, PV=nRT, where the volume V of the tank, the moles n of the gas, and the universal gas constant R, are all constant for a given tank containing a given amount of gas, the pressure P varies in a direct, one-to-one relation to the absolute temperature T. Therefore, a tank filled to the maximum rated pressure of 3,000 p.s.i.g. at the standard temperature of 70° F. (19° C.) will have a pressure of about 3,455 p.s.i.g. at 150° F. (63.3° C.). Consequently, the tank is built with a margin of safety to withstand such higher pressures at reasonably foreseeable higher temperatures. However, it would be unsafe to fill a tank at the standard 70° F. (19° C.) to a pressure higher than its maximum rated 3,000 p.s.i.g. pressure, because, if the tank is then exposed to a higher extreme but foreseeable temperature, the resulting higher pressure could exceed the safety margin and possibly rupture the tank. For the same reason, filling the tank to the rated 3,000 p.s.i.g. pressure at a lower temperature, such as 32° F. (0° C.) would result in a potentially dangerous overfill, if the vehicle is exposed to a substantially higher temperature shortly thereafter, which could increase the pressure to unsafe levels.

At the same time, it is inefficient and undesirable to underfill a customer's vehicle tank, because underfilling reduces driving range for the customer and prematurely aborts a sale for a vendor. Consequently, it is desirable to provide a complete, but proper fill to a maximum pressure that is compensated for the then current temperature in a manner that would result in the proper 3,000 p.s.i.g. maximum pressure if the actual temperature was raised to the standard 70° F. (19° C.) rating temperature.

Of course, it is also desirable to get a proper measure of the gas delivered to a customer's vehicle tank as a basis for calculating the point of sale price to be charged to the customer or for other record purposes.

A significant problem, both for determining the maximum tank fill and for measuring the amount of fuel delivered in a gas rather than a liquid setting is that because of its compressibility, the quantity of gas is difficult to measure independent of its temperature and pressure, which are usually different in the customer's vehicle tank than in the vendor's dispenser. However, it is preferred, at least from the vendor's standpoint, if not also for purposes of governmental regulation of weights and measures, to not have to rely on instruments or transducers in the customer's tank to measure pressure and temperature.

Our U.S. Pat. No. 5,238,030, which is incorporated herein by reference, was directed to a method and apparatus for determining a temperature compensated maximum tank pressure and automatic fill cut-off when such maximum pressure is reached and for measuring the mass of the natural gas fuel delivered, all from instruments or transducers in the dispenser, rather than in a customer's tank. However, restrictions and pressure losses through the delivery hose, tank valves, and lines made accurate cut off pressure still difficult to measure with that invention. Therefore, we developed the invention of our U.S. Pat. No. 5,259,424, which is also incorporated herein by reference, to provide an improved and more accurate method and apparatus for measuring the size of the customer's tank and then determining the additional mass of gas needed to get a complete fill of natural gas in the customer's tank corrected for standard pressure and temperature, all for use in combination with a mass flow measuring method and apparatus for determining maximum fill cut off and the amount (mass) of the gas actually dispensed.

While the sonic nozzle flow meter system used in our U.S. Pat. Nos. 5,238,030 and 5,259,424 described above is reasonably accurate and probably more accurate than most other flow meters used in natural gas dispensers, it assumes a constant molecular composition gas mass at (standard) pressure and temperature. Therefore, it loses accuracy when the molecular composition of the natural gas varies. It also maintains accuracy only in a restricted flow range, loses accuracy in subsonic flow, and is a function of back pressure. Therefore, there is still a need for more improvement in metering accuracy for measuring the amount of gas dispensed into a vehicle tank without having to rely on pressure and temperature transducers in the vehicle tank itself.

SUMMARY OF THE INVENTION

Accordingly, it is a general object of this invention to provide improved gas flow measurement in a natural gas dispenser.

A more specific object of this invention is to provide a method and apparatus for measuring gas flow that is accurate even when the molecular composition or mass of the gas varies.

It is also an object of this invention to provide a mass flow metering system for natural gas dispensers that is accurate over a wider range of flow rates, and is not so sensitive to back pressures and periods of subsonic flow during a vehicle tank fill operation.

Additional objects, advantages, and novel features of the invention shall be set forth in part in the description that follows, and in part will become apparent to those skilled in the art upon examination of the foregoing or may be learned by the practice of the invention. The objects and advantages of the invention may be realized and attained by means of the instrumentalities and in combinations particularly pointed out in the appended claims.

To achieve the foregoing and other objects, and in accordance with the purpose of the present invention, as embodied and broadly described herein, the method of this invention for providing more accurate mass flow measurements of a flowing gas that varies in molecular composition generally includes determining the specific heat ratio of the gas and determining mass flow rate as a function of the specific heat ratio. The method also includes flowing the gas through a nozzle and determining specific heat ratio as a function of pressure measurements upstream from and in the nozzle and determining the specific heat ratio as a function of the ratio of the pressure in the nozzle to the pressure upstream of the nozzle. Mass flow rate can then be determined by measuring density of the gas under the pressure measured upstream of the nozzle and determining mass flow rate as a function of the density, pressure ratio, and specific heat ratio. Gas flowing through the nozzle is choked at sonic velocity in the throat.

The apparatus of this invention generally comprises a flow channel that includes a nozzle, a first pressure transducer upstream of the nozzle entrance, a second pressure transducer tapped into the nozzle, and a densitometer positioned to measure gas density at the pressure measured by the first pressure transducer.

BRIEF DESCRIPTION OF THE DRAWINGS

The accompanying drawings, which are incorporated herein and form a part of this specification illustrate the preferred embodiment of the present invention, and together with the description, serve to explain the principles of the invention.

In the Drawings

DESCRIPTION OF THE PREFERRED EMBODIMENTS

Figure 1:
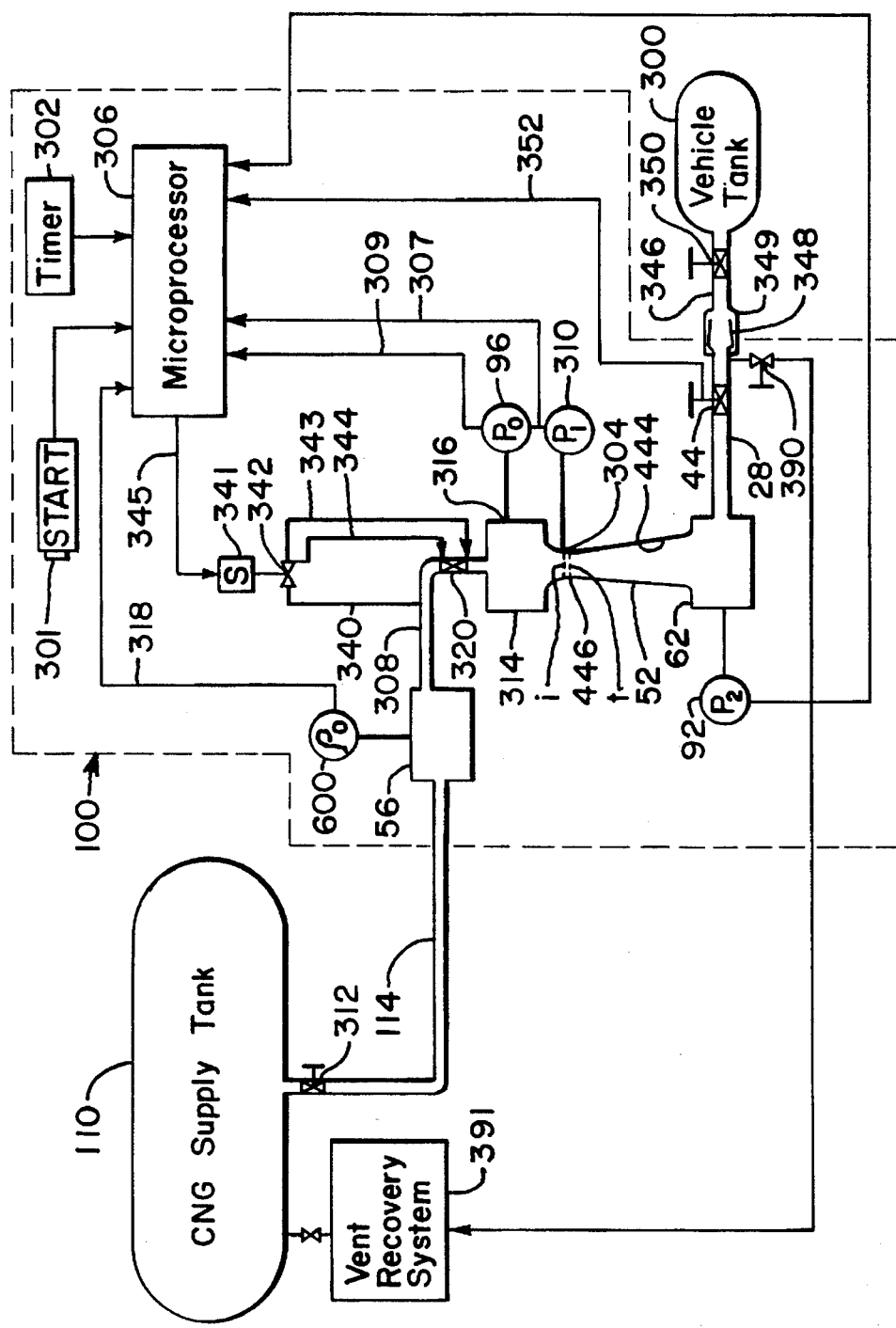
FIG. 1 is a schematic diagram of a natural gas dispensing system utilizing the improved flow metering method and apparatus of this invention.
Figure 2:
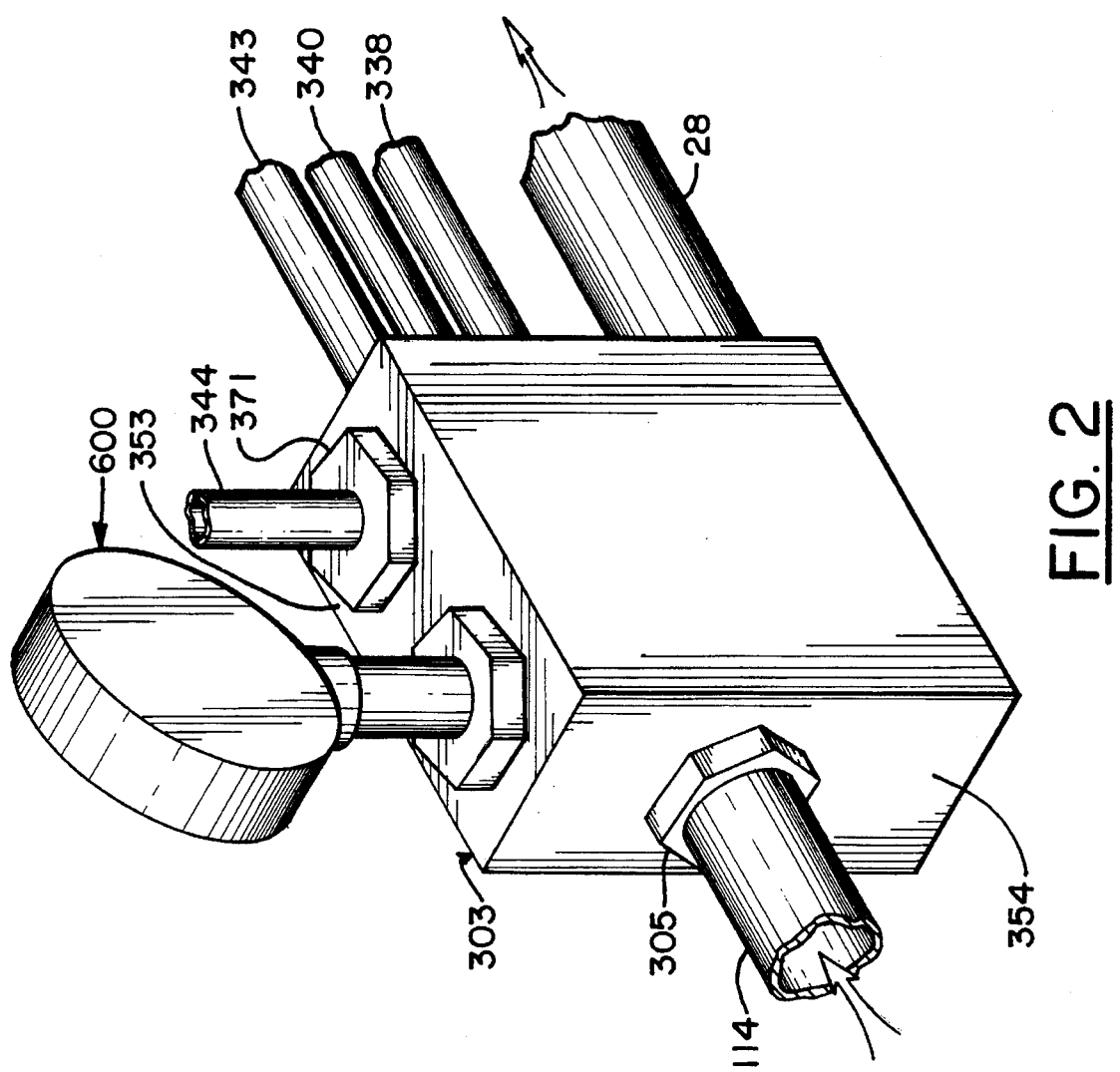
FIG. 2 is a perspective view of a gas metering apparatus constructed according to the present invention.
Figure 3:
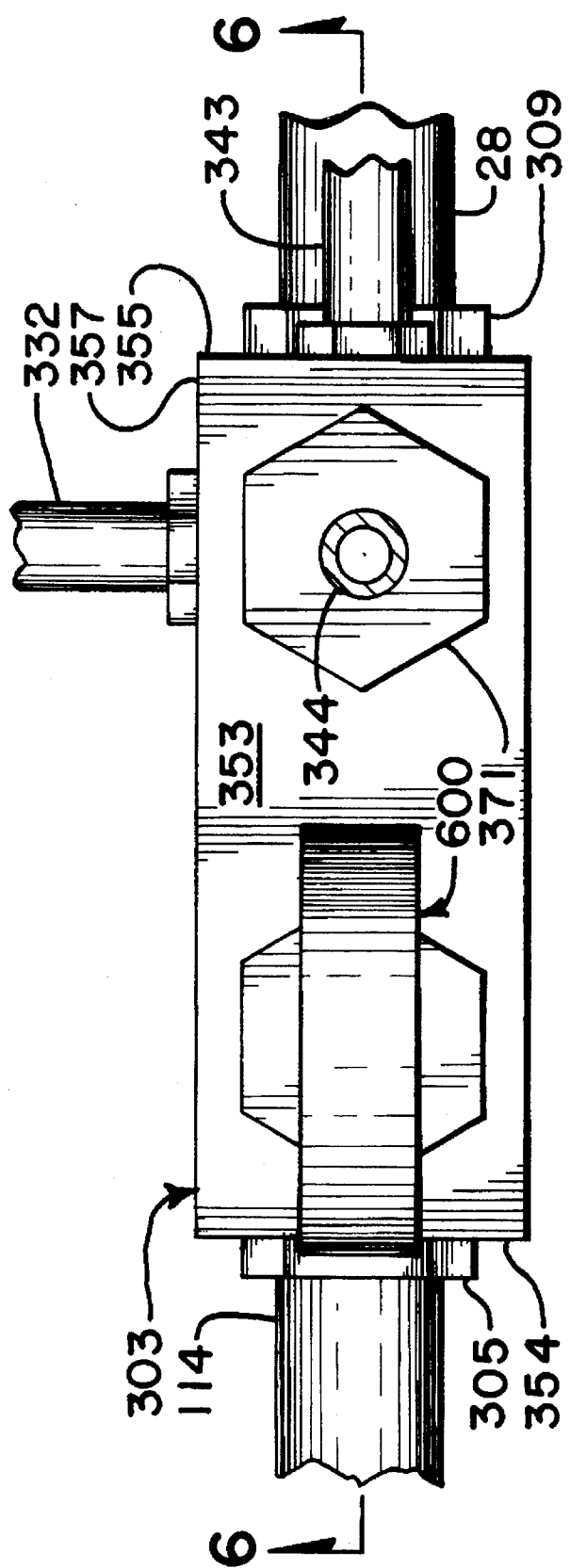
FIG. 3 is a top plan view of the gas metering apparatus shown in FIG. 2.
Figure 4:
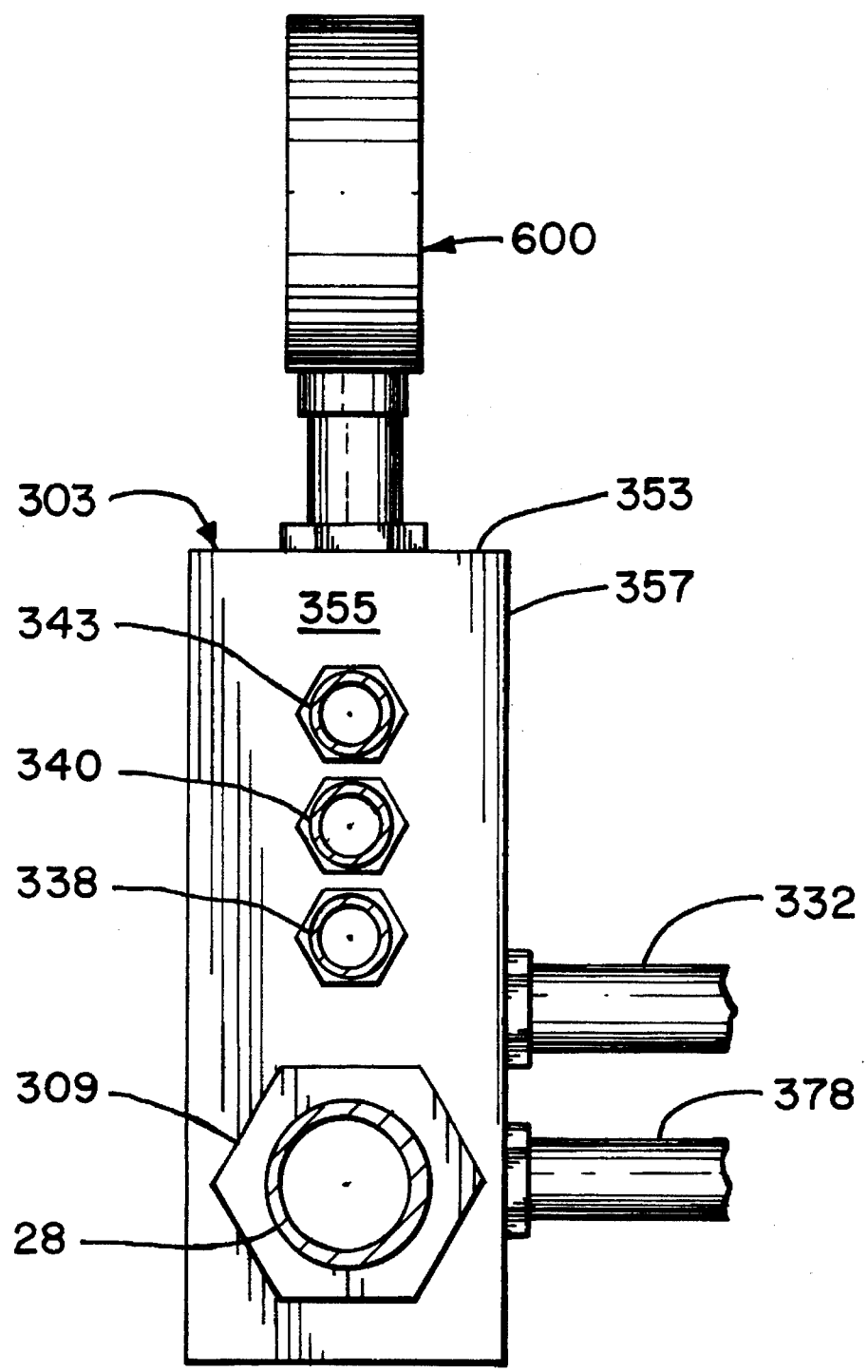
FIG. 4 is a right (downstream) side elevation view of the gas metering apparatus shown in FIG. 2.
Figure 5:
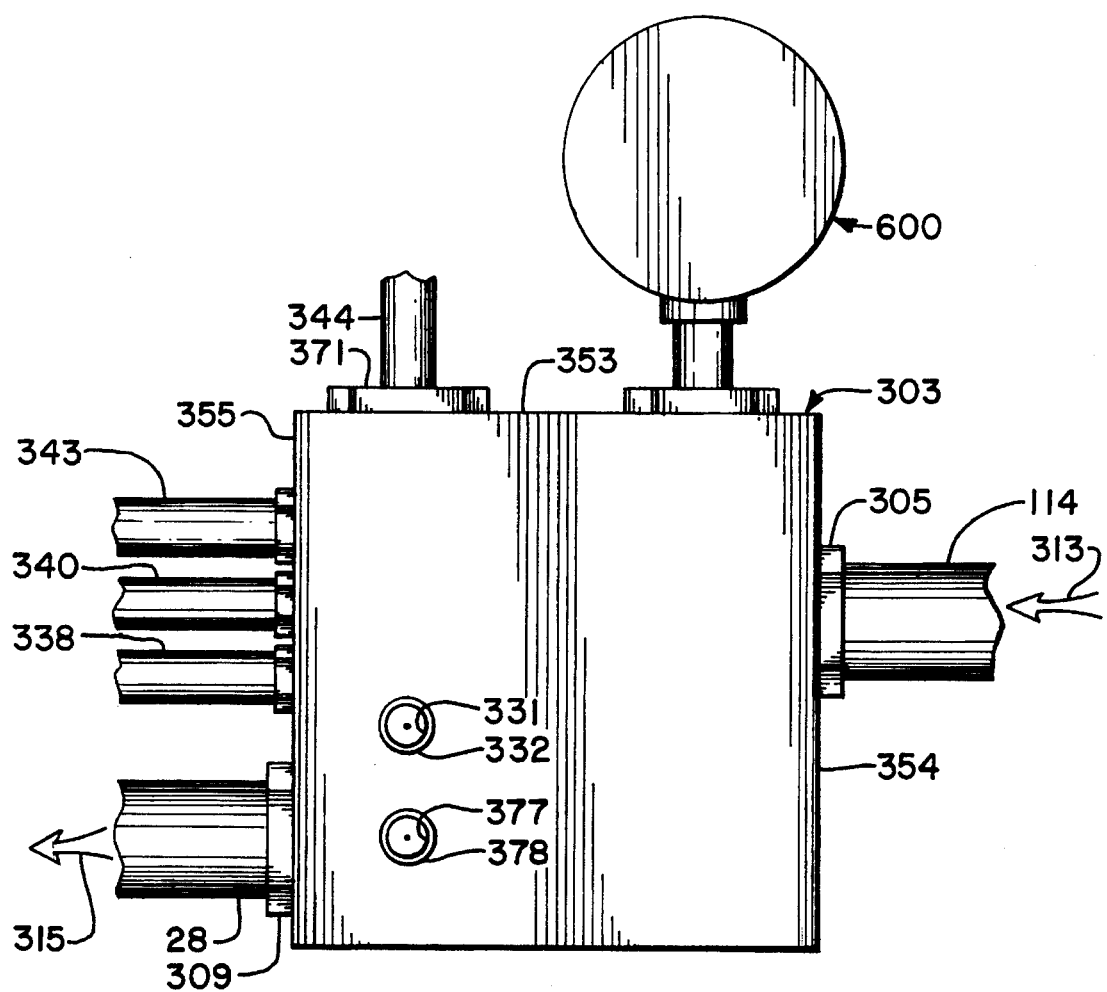
FIG. 5 is a rear elevation view of the gas metering apparatus shown in FIG. 2.

As shown in the schematic diagram of FIG. 1, a gas dispenser 100 connected to a high pressure gas supply, represented by the large storage tank 110, via a high pressure conduit or pipe 114 is adapted for dispensing gas, such as compressed natural gas (CNG), into a receiver or vehicle tank 300. The dispenser 100 measures mass flow of the gas being dispensed into the vehicle tank 300 on a real time basis based on a real time determination of specific heat of the gas being dispensed, as will be described in more detail below. The gas is delivered via the high pressure conduit 114 from the supply tank 110 to an inlet plenum 56 in dispenser 100, where a densitometer 600 connected to the inlet plenum 56 measures the density $\rho_o$ of the natural gas before it flows through a sonic or critical flow nozzle 52 and into the receiver or vehicle tank 300 via dispenser hose 28. In addition to gas density $\rho_o$ measurements from densitometer 600, stagnant pressure $P_o$ measurements by a pressure transducer 96 just upstream of the sonic nozzle 52 and dynamic pressure $P_i$ measurements in the nozzle 52 by a pressure transducer 310 are also obtained. These parameters of gas density $\rho_o$, stagnant gas pressure $P_o$, and a flowing gas pressure $P_i$ in the sonic nozzle 52 can be used according to this invention to determine specific heat of the gas and then to determine the mass flow rate of the gas flowing though the nozzle 52. The mass flow rate can be used on a real time basis to measure and record the mass of gas dispensed into the vehicle tank 300. According to the principles of the invention in our U.S. Pat. No. 5,238,030, the size of the tank and the additional mass of gas required to fill the tank to a temperature compensated maximum pressure fill can be determined, and an automatic shut-off can be implemented, based on the mass flow rate acquired according to this invention. Of course, where sales price is based on mass, a simple additional calculation multiplying price per unit of mass times the total mass of the gas dispensed can also produce the total sales price of the gas dispensed into the vehicle tank 300. On the other hand, if sales price is based on a standard cubic foot, the total mass dispensed can be convened to standard cubic feet by wellknown mole, molecular weight, pressure, temperature, and volume relationships.

The measurement of mass flow rate of the gas according to this invention makes beneficial use of relationships of specific heat to mass of the gas and the fact that flow through a sonic nozzle is isotropic (no energy loss) to obtain accurate mass flow rate measurements of the gas, regardless of molecular composition or non-ideal gas characteristics of the gas being measured. To implement this invention, a pressure tap 304 is positioned at, or preferably slightly (a few thousandths of an inch) upstream of, the throat 446 of the nozzle 52 to get a pressure $P_i$ measurement of the fluid flowing through a cross-section i of the nozzle 52. The mass flow rate $\dot{m}_i$ of the gas through section i can be expressed by the equation:

$$\dot{m}_i = \rho_i A_i V_i \quad (1)$$

where:

$\rho_i$ = density of the gas at the cross-section i;

$A_i$ = cross-sectional area of the nozzle at cross-section i; and $V_i$ = velocity of the gas flowing through the cross-section i.

Of course the cross-sectional area $A_i$ of the nozzle 52 at section i is fixed by its dimensions and can be determined by scalar measurement. The gas density $\rho_i$ at the cross-section i can be determined by the relationship:

$$\rho_i = \rho_o \left( \frac{P_i}{P_o} \right)^{1/k} \quad (2)$$

where:

$\rho_o$ = density of the gas at stagnant pressure $P_o$;

$P_o$ = stagnant pressure of the gas just upstream of the sonic nozzle;

$P_i$ = pressure of the gas flowing through the cross-section i of the nozzle; and k = specific heat ratio of the gas (heat capacity per unit of mass).

The velocity $v_i$ at the cross-section i can also be expressed in terms of $\rho_o$, $P_o$, $P_i$, and k by applying the energy equation to get $$v_i = \sqrt{\left(\frac{2k}{k-1}\right)\left(\frac{P_o}{\rho_o}\right)\left[1-\left(\frac{P_i}{P_o}\right)^{\frac{k-1}{k}}\right]} \quad (3)$$

$$\dot{m}_i = A_i\left[\rho_o\left(\frac{P_i}{P_o}\right)^{\frac{1}{k}}\right]\sqrt{\left(\frac{2k}{k-1}\right)\left(\frac{P_o}{\rho_o}\right)\left[1-\left(\frac{P_i}{P_o}\right)^{\frac{k-1}{k}}\right]} \quad (4)$$

Likewise, mass flow rate at the cross-section t of the smallest area or throat 446 can be expressed as $$\dot{m}_t = \rho_t A_t V_t \quad (5)$$

where:
$\rho_t$ = gas density at the throat t;
$A_t$ = cross-sectional area at the throat t; and
$V_t$ = velocity of gas flow at the throat cross-section t.

When the sonic nozzle is choked, the mass flow $\dot{m}_t$, at the throat 446 is fixed for a particular gas temperature T and pressure $P_o$ upstream of the nozzle 52, as explained in more detail in our U.S. Pat. Nos. 5,238,030 and 5,259,424. The density $\rho_t$ of the gas at the throat 466 is $$\rho_t = \rho_o\left(\frac{2}{k+1}\right)^{\frac{1}{k-1}} \quad (6)$$

and the velocity $V_t$ of the gas at the throat 466 is $$v_t = \sqrt{kR\left(\frac{2}{k+1}\right)T_o} \quad (7)$$

where:
R = the universal gas constant; and
$T_o$ = temperature of the gas just upstream of the nozzle.

Therefore, substituting equations (6) and (7) into equation (5) yields mass flow rate $\dot{m}_t$ at the throat in terms of the formula:

$$\dot{m}_t = \rho_o\left(\frac{2}{k+1}\right)^{\frac{1}{k-1}}(A_t)\sqrt{kR\left(\frac{2}{k+1}\right)T_o} \quad (8)$$

Since:

$$\frac{P_o}{\rho_o} = RT_o$$

(state equation), equation (8) reduces to:

$$\dot{m}_t = A_t\left(\frac{2}{k+1}\right)^{\frac{1}{k-1}}\sqrt{\frac{2k}{k+1}}\sqrt{P_o\rho_o} \quad (9)$$

Since the mass flow rate $\dot{m}_t$ at the throat cross-section t under choked condition is constant, the mass flow rate $\dot{m}_i$ at cross-section i upstream of the throat is also constant and is the same as the mass flow rate $\dot{m}_t$ at the throat. Therefore, equations (4) and (9) can be equated to yield:

Therefore, substituting equation (2) and (3) into equation (1) yields mass flow rate $\dot{m}$, as follows:

$$A_i\left[\rho_o\left(\frac{P_i}{P_o}\right)^{\frac{1}{k}}\right]\sqrt{\left(\frac{2k}{k-1}\right)\left(\frac{P_o}{\rho_o}\right)\left[1-\left(\frac{P_i}{P_o}\right)^{\frac{k-1}{k}}\right]} = A_t\left(\frac{2}{k+1}\right)^{\frac{1}{k-1}}\sqrt{\frac{2k}{k+1}}\sqrt{P_o\rho_o} \quad (10)$$

Simplifying provides a relationship among $P_i$ to $P_o$ ratio, $A_t$ to $A_i$ ratio, and specific heat ratio k, as follows:

$$\sqrt{1-\left(\frac{P_i}{P_o}\right)^{\frac{k-1}{k}}} = \left[\frac{A_t}{A_i}\left(\frac{2}{k+1}\right)^{\frac{1}{k-1}}\sqrt{\frac{k-1}{k+1}}\right]\left(\frac{P_i}{P_o}\right)^{-\frac{1}{k}} \quad (11)$$

Therefore, since the cross-sectional areas $A_t$ and $A_i$ are fixed by the geometry of the nozzle 52 and by the placement of the pressure tap 304 in the nozzle 52, obtaining pressure measurements for $P_i$ and $P_o$ enables a solution for specific heat ratio k from equation (11). Then, using the calculated specific heat ratio k from equation (11) along with the already measured pressures $P_i$ and $P_o$ and also obtaining a measurement of the gas density $P_o$ at the pressure $P_o$, an accurate mass flow rate $\dot{m}_i$ can be calculated from equation (4), regardless of the molecular composition of the gas being dispensed.

As mentioned above, the mass flow rate $\dot{m}_i$ at the cross-section i is the same as the mass flow rate $\dot{m}_t$ at the throat cross-section t or, for that matter, is the same as the mass flow rate $\dot{m}$ through any section of the nozzle 52. Therefore, $\dot{m}_i$ calculated for a given pressure $P_i$, a given pressure $P_o$, and a given density $\rho_o$ is a measure of the instantaneous mass flow rate $\dot{m}$ delivered to the vehicle tank 300. When the $P_i$, $P_o$, and $\rho_o$ values are updated frequently on a real time basis, fed to a microprocessor 306, and recalculated rapidly, the resulting sequentially recalculated values of $\dot{m}_i$ provide effectively real time mass flow rate $\dot{m}$ measurements of the gas dispensed to the vehicle tank 300. Multiplying mass flow rate $\dot{m}$ by time, which can also be done rapidly at many short time intervals with the microprocessor 306, provides a cumulative or running total of the mass of gas dispensed into the vehicle tank 300 on a real time basis.

The flowing pressure $P_i$ and stagnant pressure $P_o$ can be obtained with respective state-of-the-art pressure transducers 310 and 96, which can be, for example, a 5,000 p.s.i.a pressure transducer Engineering Measurements Company of Longmont, Colo., EG&G Chandler Enginering of P.O. Box 470710, Tulsa, Okla. The gas density $\rho_o$ can be obtained with a state-of-the-art densitometer 600, for example, a Model UGC 278 densitometer manufactured by EG&G Chandler Engineering of P.O. Box 470710, Tulsa, Okla., or a Model FD 700, manufactured by Sarasota Automation, Inc., of 10335 Landsbury, Suite 300, Houston, Tex., or a Model 7812 manufactured by Schlumberger Industries, Transducer Dvision, 11321 Richmond Avenue, M-102, Houston Tex., or a densitometer manufactered by Engineering Measurements Company of Longmont, Colo.

In operation, the main valve 312 at the supply tank 110 is opened to allow gas to flow through supply pipe 114 to the intake plenum 56 of the dispenser 100 of this invention. The densitometer 600 can be connected to the intake plenum 56, and density readings can be fed through a connection 318 to the microprocessor 306. From the intake plenum 56, the gas flows through an intermediate conduit 308 to the staging plenum 314, where stagnation pressure $P_o$ is obtained through a pressure tap 316 by the $P_o$ pressure transducer 96. A shut-off valve 320 is positioned between the supply tank 110 and the staging plenum 314 for turning the gas flow "on" and "off" in response to signals from the microprocessor 306. The pressure signals can be fed from transducers 310 and 96 via respective connections 307 and 309 to the microprocessor 306.

Figure 6:
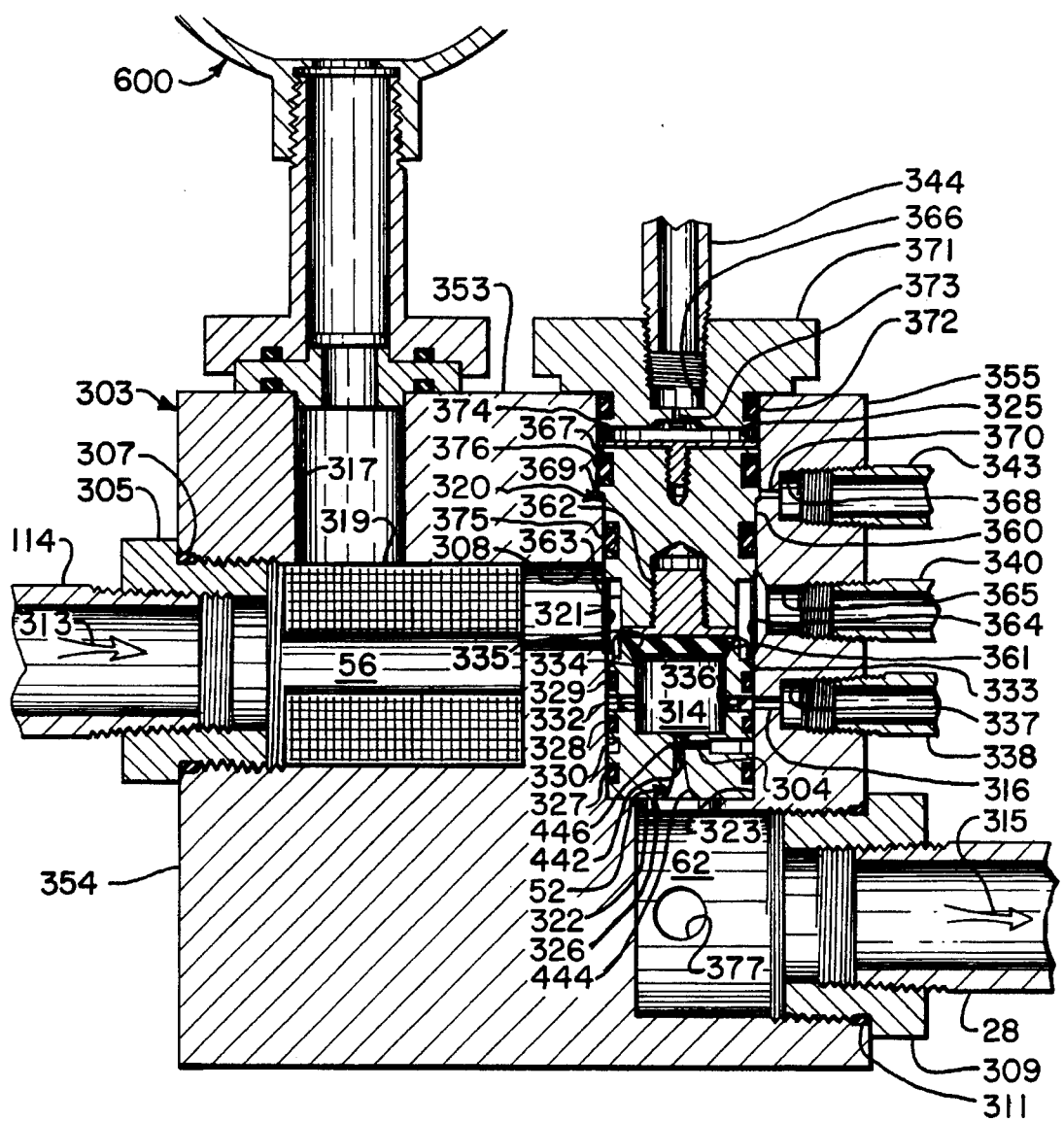
FIG. 6 is a cross-sectional view of the gas metering apparatus of this invention taken along lines 6—6 of FIG. 3.

In the preferred embodiment dispenser 100, the shut-off valve 320 is positioned between the conduit 308 and staging plenum 314 in axial alignment with the sonic nozzle 52, as shown in FIG. 1 and 6, and it is pilot operated with gas pressure from the intermediate conduit 308. The pilot gas pressure is directed by pilot supply line 340 through a solenoid-operated pilot valve 342 and then through either pilot operating line 343 or 344 to close or open the shut-off valve 320. Signals from the microprocessor 306 via a connection 345 actuate the solenoid pilot valve 342 to apply gas pressure to a pilot actuator (not shown in FIG. 1) on shut-off valve 320 to close the shut-off valve 320 or to release gas pressure to open shut-off valve 320, as will be described in more detail below.

Gas is delivered from the dispenser 100 to the vehicle tank 300 by a delivery or dispenser hose 28. The dispenser hose 28 and intake pipe 346 of vehicle tank 300 have respective mating couplers 348 and 349 for connecting the dispenser hose 28 to vehicle tank 300. A valve 350, usually manually operated, is provided in the intake pipe 346 of tank 300, and a delivery valve 44, also usually manually operated, is provided on the distal end of dispenser hose 28. The proximal end of dispenser hose 28 is connected to an outlet plenum 62 positioned at the downstream end of the nozzle 52.

With couplers 348, 349 connected together and the valve 350 on vehicle tank 300 opened, the delivery valve 44 can also be opened. A signal can be sent automatically via connection 352 or manually via a switch (not shown) to start the microprocessor and let it know that the couplers 348, 349 and valves 350, 44 are set for a fill operation.

The microprocessor 306 is preferably programmed to go through an initialization procedure similar to that described in our U.S. Pat. Nos. 5,238,030 and 5,259,424, to calibrate the $P_i$ and $P_o$ pressure transducers 310 and 96 to each other. In other words, with the shut-off valve 320 still closed and with the delivery valve 44 and tank valve 350 opened, the stagnant pressures throughout the system downstream of shut-off valve 320 all the way to and including the vehicle tank 300 should equalize, so the pressure transducers 310 and 96 should read the same values. If not, the microprocessor 306 is programmed to add a correction value equal to the difference in the two transducers 310, 96 to the readings of one of them as explained in more detail in our U.S. Pat. Nos. 5,238,030 and 5,259,424. As also mentioned in our U.S. Pat. Nos. 5,238,030 and 5,259,424, it might be necessary to first briefly open and then close valve 320 to pop open a one way check valve (not shown) that is usually positioned in the vehicle tank 300 in order to get a read on the initial pressure in tank 300 with pressure transducers 310 or 96.

The fill operation can be initiated with a start switch 301 or any other device that sends a start signal to the microprocessor 306, which in turn initializes time and other functions, as described above. To start the flow of gas, the microprocessor 306 sends a signal via connection 345 to solenoid 341 to open pilot valve 342, which applies gas pressure via conduit 344 to open the shut-off valve 320, as will be described in more detail below. When the shut-off valve 320 is opened, gas flows from the supply tank 110, assuming main tank valve 312 is already open, as is the usual case after initial set up and assembly. The gas flows through inlet plenum 56, where densitometer 600 takes density $\rho_o$ measurements of the gas and through conduit 308 to staging plenum 314. The plenums 56 and 314 should be large enough to have substantially stagnant pressure conditions, in spite of gas flowing through them, so that pressure $P_o$ and density $\rho_o$ measurements are at stagnant conditions. The plenums 56 and 314 should also be in close proximity to each other and to the sonic nozzle 52 to ensure that the gas for which density $\rho_o$ measurements are taken is substantially the same in composition as the gas being measured in the sonic nozzle 52. With the valve 320 open, the pressure in the inlet plenum 56 should be substantially the same as the pressure $P_o$ in staging plenum 314, so the density $\rho_o$ measurement is made essentially at $P_o$ pressure. The $P_o$ pressure is measured by the pressure transducer 96 tapped into staging plenum 314, as described above. Actually, the density $\rho_o$ reading could be taken in the staging plenum 314, and the inlet plenum 56 could be eliminated in alternately structured dispensers.

From the staging plenum 314, the gas flows into the converging section 442 of the sonic nozzle 52, through the throat 446 and diverging section 444 of the sonic nozzle 52, and into the outlet plenum 62. As long as the ratio of pressure $P_2$ downstream of the nozzle 52 to the pressure $P_o$ upstream of the nozzle 52 is less than critical (approximately 0.85), the flow of gas through the throat 446 is choked at sonic velocity and cannot increase. Consequently, the flow where pressure $P_i$ is measured, which is preferably slightly upstream of the throat 446, is always subsonic. While it is not necessary to the determination of mass flow according to this invention, when flow through the nozzle 52 is choked at sonic velocity, a pressure transducer 92 for measuring the pressure $P_2$ at the outlet of the diffuser section 444 is tapped into outlet plenum 62 and connected to microprocessor 306 to monitor the $P_2/P_o$ ratio. If the $P_2/P_o$ rises above the critical level of about 0.85, such as near the end of a dispensing cycle when the vehicle tank 300 is almost filled, then Equation (4) above is used to calculate mass flow rate $\dot{m}$, assuming a constant specific heat k equal to the specific heat k that was previously measured when the flow was critical, i.e., when the $P_2/P_o$ was less than about 0.85. The sensitivity of Equation (4) to specific heat k changes is very small for $P_2/P_o$ ratios greater than critical, so any changes in specific heat k during subsonic flow have a negligible effect on overall metering accuracy. Of course, the mass flow rate $\dot{m}$ determinations according to this invention with the formula of Equation (4) above can also be made with specific heat ratio k measurements or values obtained with other, more conventional methods or from look-up tables after determining molecular composition of the gas, such as with a chromatograph. However, the method and apparatus for determining specific heat ratios k according to this invention, as described above, have the advantage of real-time application, which is significant for natural gas, which varies in composition in different locations and even in the same locations from well to well or from time to time.

From the outlet plenum 62, the gas continues flowing through dispenser hose 28 to the vehicle tank 300, as described above. At the same time, the $P_o$ and $P_i$ information from transducers 96 and 310 are fed to the microprocessor 306, which uses that information along with preprogrammed area $A_t$ of the throat cross-section t and area $A_i$ of the cross-section i in converging section 442 of sonic nozzle 52 to determine the specific heat ratio k of the gas according to equation (11), as described above. The microprocessor 306 then uses the determined value of specific heat ratio k along with the measured gas density $\rho_o$, stagnant pressure $P_o$, flowing pressure $P_i$, and area $A_i$ of the cross-section i to determine mass flow rate $\dot{m}_i$ according to equation (4), as described above. The microprocessor 306 can be programmed to use the specific heat k or some average of recent specific heat k values for calculating mass flow rate $\dot{m}$ with Equation (4) when the $P_2/P_o$ ratio reaches or climbs above critical (about 0.85), as described above. Of course, multiplying mass flow rate $\dot{m}_i$ times the elapsed time from any time interval yields the mass of gas flowed through the nozzle 52 during that interval. Real time in terms of minutes or seconds, or even fractions of seconds can be input to the microprocessor 306 by an appropriate timing device 302. The shorter the time intervals used, i.e., the more sequential recalculations of specific heat k and mass flow measurements made during a vehicle tank fill, the more accurate will be the mass flow measurements, because the values of the parameters k, $\rho_o$, $P_o$, and $P_i$ will be more specific and accurate for such shorter time intervals. The microprocessor 306 can also tabulate sequential mass determinations of sequential time intervals throughout the gas fill process to keep a real time running total of mass delivered to the vehicle tank 300. For purposes of this invention, sequential recalculations of specific heat k and mass flow measurements at time intervals on the order of milliseconds yields very accurate mass flow values. The method and apparatus of this invention can measure mass flow of natural gas being dispensed significantly more accurately than the mass flow determinations obtained by the inventions described in our U.S. Pat. Nos. 5,238,030 and 5,259,424.

While this invention is directed primarily to improved mass flow measuring in gas dispensers, it is appropriate to note that the microprocessor 306, with an additional ambient temperature or gas temperature input (not shown), can be programmed to determine the volume of the vehicle tank 300, a temperature compensated maximum pressure for the vehicle tank 300, the additional mass of gas required to fill the vehicle tank 300, to that temperature compensated maximum pressure, the mass of gas actually dispensed, and to output a signal to the solenoid 341 to operate the pilot valve 342 to shut-off valve 320 when the mass of gas actually dispensed equals the mass required for maximum temperature compensated fill, all as described in our U.S. Pat. No. 5,238,030. When the fill is complete and the shut-off valve 320 is closed, the hose valve 44 and vehicle tank valve 350 can be closed and the coupler 348, 349 can be disconnected. When disconnecting couplers 348, 349, it may be desirable to open bleed valve 390 to bleed residual gas trapped between valves 44 and 350 to a vent recovery system 391, which is well known in this art and not a part of this invention.

The electrical power supplies to the density and pressure transducers, amplifiers, filters, analog-to-digital converters, and other electric circuit components to the microprocessor connections that implement this invention are well-known and within the capabilities of persons skilled in that art, once the principles of this invention are understood, so they are not described in any greater detail. A number of safety features, such as those to detect broken or disconnected hoses, as described in our U.S. Pat. Nos. 5,238,030 and 5,259,424, as well as other safety features may be used with this invention. However, such safety features are not a part of this invention, so are not described in anymore detail herein.

The structures and mechanical components of the valve and fluid flow dispenser measuring apparatus according to this invention might not be as obvious, so an exemplary embodiment is shown in FIGS. 2–6. A housing 303 contains the inlet plenum 56, shut-off valve 320, staging plenum 314, sonic nozzle 52, and outlet plenum 62, as best seen in FIG. 6. A pipe fitting 305 sealed with an o-ring seal 307 connects the high pressure supply line 114 to the inlet plenum 56, which is bored into the upstream face 354 of housing 303. A similar pipe fitting 309 and o-ring seal 311 connects the threaded end of the dispenser hose 28 to the outlet plenum 62, which is bored into the downstream face 355 of housing 303. Therefore, the gas flows into the housing 303 from the source of supply 110 (not shown in FIGS. 2–6), through fitting 305, as indicated by arrow 313, and it flows out of housing 303 through fitting 309, as indicated by arrow 315 to vehicle tank 300 (not shown in FIGS. 2–6).

The densitometer 600 is connected via a duct 317 bored into the housing 303 from the top surface 353 to the inlet plenum. An annular filter 319 in plenum 56 protects the densitometer 600 from solid or liquid impurities that might be in the gas. The intermediate conduit 308 extends through the housing 303 to a valve chamber 321 that is bored into the housing 303 from the top surface 353 substantially perpendicular to the conduit 308. The valve chamber 321 is bored in four different diameter sections 322, 323, 324, 325, with the smallest section 322 extending into the outlet plenum 62.

A nozzle plug 326 with the sonic nozzle 52 extending axially therethrough is positioned in the bottom of the smaller intermediate section 323 of the valve chamber 321 and is sealed by o-ring seals 327, 328. An annular $P_i$ pressure chamber 330 is recessed into the peripheral surface of nozzle plug 326 between the o-ring seals 327, 328. The $P_i$ pressure tap 304 is bored laterally from the annular $P_i$ pressure chamber 330 through the nozzle plug 326 to intersect perpendicularly with the sonic nozzle 52 slightly above the throat 446. The $P_i$ pressure transducer 310 (shown only in FIG. 1) is connected by a tube 332 to a $P_i$ pressure port 331 that extends from the left side 357 of housing 303 into an intersection with the smaller intermediate section 323 of valve chamber 321 in alignment with the annular $P_i$ chamber 330. An axial recess 332 in the top of the nozzle plug 326 forms the lower part of staging plenum 314.

A cylindrical sleeve 333 with an internal axial bore 334 is positioned in the top of the smaller intermediate section of valve chamber 321 and forms the upper part of staging plenum 314. An o-ring seal 329 encircles the periphery of sleeve 333, and a tapered upper rim forms a valve seat 335. A space between the top of nozzle plug 326 and the bottom of sleeve 333 forms an annular extension 336 of staging plenum 314. The $P_o$ pressure tap 316 is bored laterally through housing 303 from a $P_o$ pressure port 337 in downstream face 355 into the valve chamber 321 in alignment with the annular extension 336. The $P_o$ pressure transducer 96 (shown only in FIG. 1) is connected to port 337 via a tube 338, so the $P_o$ pressure transducer 96 can measure the $P_o$ pressure in staging plenum 314.

A valve plunger 360 is positioned slidably in the larger intermediate section 324 of valve chamber 321 for opening and closing the staging chamber 314 to the intermediate conduit 308. A soft valve closure 361, preferably fabricated of a soft neoprene or rubber material, is adhered to a bolt 362 that is screwed into the lower end of plunger 360 for seating in the valve seat 335. The lower end of plunger 360 is a narrowed neck 363 that leaves an annular space 364 around the plunger 360 that is connected to intermediate conduit 308. A port 365 in the downstream side 355 of housing 303 connects to the annular space 364, thus also to intermediate conduit 308, which is open to the supply gas pressure line 114. Therefore, the pilot supply tube 340 attached to port 365 always has high pressure gas, regardless of the position of valve plunger 360 in valve chamber 321. This gas pressure in pilot supply tube 340 can be supplied selectively by the 3-way pilot valve 342 (FIG. 1) to either the top of plunger 360 via pilot operating tube 344 and port 366 to move the plunger 360 downwardly into seat 335 or to the underside of flange 367 of plunger 360 via pilot operating tube 343 and port 368 to move the plunger 360 upwardly away from seat 335.

The pilot operated shut-off valve 320 is comprised primarily of the valve seat 335, the slidable plunger 360, and the soft closure 361, which assembly opens or closes the staging plenum 314 to intermediate conduit 308. The enlarged flange 367 on the upper end of plunger 360 fits in the largest diameter section 325 of valve chamber 321. The annular space 369 under the flange 367 is connected to port 368 by a tap 370 bored laterally into housing 303 to the lowest part of the largest diameter section 325 of valve chamber 321. Connecting this annular space 369 to gas pressure via pilot tube 343, while bleeding pressure off the top of plunger 360 will cause the plunger 360 to move upwardly, thus opening the value 320.

The port 366 to which the other pilot tube 344 is connected is bored into a bonnet 371, which, along with seal 372, closes the top of valve chamber 321. A tap 373 connects the port 366 to the space 374 in valve chamber 321 between the top of plunger 360 and the bottom of bonnet 371. Applying gas pressure to this space 374 while bleeding pressure off the annular space 369 causes the plunger 360 to move downwardly and seat in the valve seat 335, thus closing valve 320. Seals 375, 376 around the plunger 360 on either side of annular space 369 prevent leakage around the sides of the plunger 360.

Of course, the valve 320 could be actuated by air pressure, by a solenoid, or by any other well-known mechanism, and does not have to be pilot gas operated for purposes of this invention. The $P_2$ pressure transducer 92 (FIG. 1) is connected by a tube 378 to a port 377 extending from the left side 357 into the outlet plenum 62.

The foregoing is considered as illustrative only of the principles of this invention. Further, since numerous modifications and changes will readily occur to those skilled in the art, it is not desired to limit the invention to the exact construction and operation shown and described, and accordingly, all suitable modifications and equivalents may be considered as falling within the scope of the invention as defined by the claims which follow.

The embodiments of the invention in which an exclusive property or privilege is claimed are defined as follows:

1. Apparatus for measuring specific heat ratio k of a gas, comprising:

a sonic nozzle having a flow passage that converges from an entrance to a throat that has a cross-sectional area $A_t$ and diverges after the throat to an exit;

a staging plenum adjacent said entrance that is large enough to have stagnant pressure conditions of a gas that flows through said staging plenum, into said nozzle, and through said throat at sonic choked or velocity;

stagnant pressure sensing means connected to said staging plenum for measuring stagnant pressure $P_o$ of a gas in said staging plenum;

flow pressure transducer means tapped into said flow passage at a location having a cross-sectional area $A_i$ adjacent said throat for measuring pressure $P_i$ of a gas flowing through said nozzle; and microprocessor means connected to said stagnant pressure sensing means and to said flow pressure transducer means for determining specific heat k of a gas flowing through said sonic nozzle in choked or sonic flow condition according to relationships that can be expressed by the formula:

$$\sqrt{1 - \left(\frac{P_i}{P_o}\right)^{\frac{k-1}{k}}} = \left[\frac{A_t}{A_i}\left(\frac{2}{k+1}\right)^{\frac{1}{k-1}}\sqrt{\frac{k-1}{k+1}}\right]\left(\frac{P_i}{P_o}\right)^{-\frac{1}{k}}$$

2. The apparatus of claim 1, wherein said flow pressure transducer means is tapped into said flow passage at a location upstream of said throat.

3. The apparatus of claim 1, including densitometer means positioned for determining density $\rho_o$ of said gas at stagnant pressure $P_o$, said microprocessor means also being connected to said densitometer means for determining mass flow rate $\dot{m}$ of said gas according to relationships that can be expressed by the formula:

$$\dot{m} = A_i\left[\rho_o\left(\frac{P_i}{P_o}\right)^{\frac{1}{k}}\right]\sqrt{\left(\frac{2k}{k-1}\right)\left(\frac{P_o}{\rho_o}\right)\left[1 - \left(\frac{P_i}{P_o}\right)^{\frac{k-1}{k}}\right]}$$

4. The apparatus of claim 3, wherein said microprocessor means is programmed to determine specific heat k and mass flow rate $\dot{m}$ on a real-time basis.

5. The apparatus of claim 3, wherein said microprocessor means is programmed to determine specific heat k and mass flow rate $\dot{m}$ at short sequential time intervals.

6. The apparatus of claim 5, wherein said microprocessor means is programmed to calculate mass flow over one of said time intervals by multiplying mass flow rate $\dot{m}$ by one of said time intervals.

7. The apparatus of claim 6, wherein said microprocessor means is programmed to calculate sequential mass flows over a plurality of said sequential time intervals and to add said sequential mass flows together to determine cumulative mass flow over the duration of said plurality of said time intervals.

8. A method of determining specific heat k of a gas, comprising the steps of:

flowing said gas through a sonic nozzle that has a flow passage which converges from an entrance to a throat having a cross-sectional area $A_t$ and diverges from the throat to an exit under sufficient pressure differential between said entrance and said exit to cause the gas flow to choke at sonic velocity in said throat;

measuring stagnant pressure $P_o$ of said gas at said entrance;

measuring pressure $P_i$ of said gas flowing at a location in said flow passage having a cross-sectional area $A_i$; and determining specific heat k of said gas according to relationships that can be expressed by the formula:

$$\sqrt{1-\left(\frac{P_i}{P_o}\right)^{\frac{k-1}{k}}} = \left[\frac{A_t}{A_i}\left(\frac{2}{k+1}\right)^{\frac{1}{k-1}}\sqrt{\frac{k-1}{k+1}}\right]\left(\frac{P_i}{P_o}\right)^{-\frac{1}{k}}$$

9. The method of claim 8, wherein said step of measuring pressure $P_i$ is done at a location that is in the converging portion of said flow passage slightly upstream of said throat.

10. A method of measuring mass flow of a gas, comprising the steps of:

flowing said gas through a nozzle that has a flow passage which converges from an entrance to a throat that has a cross-sectional area $A_t$ and diverges from the throat to an exit under sufficient pressure differential between said entrance and said exit to cause the gas flow to choke at sonic velocity in said throat;

measuring stagnant pressure $P_o$ of said gas at said entrance;

measuring flow passage pressure $P_i$ of said gas at a location in said flow passage having a cross-sectional area $A_i$;

determining specific heat k of said gas according to relationships that can be expressed by the formula:

$$\sqrt{1-\left(\frac{P_i}{P_o}\right)^{\frac{k-1}{k}}} = \left[\frac{A_t}{A_i}\left(\frac{2}{k+1}\right)^{\frac{1}{k-1}}\sqrt{\frac{k-1}{k+1}}\right]\left(\frac{P_i}{P_o}\right)^{-\frac{1}{k}}$$

measuring density of said gas at said stagnant pressure $P_o$; and determining mass flow rate $\dot{m}$ of said flow of gas according to relationships that can be expressed by the formula:

$$\dot{m} = A_i\left[\rho_o\left(\frac{P_i}{P_o}\right)^{\frac{1}{k}}\right]\sqrt{\left(\frac{2k}{k-1}\right)\left(\frac{P_o}{\rho_o}\right)\left[1-\left(\frac{P_i}{P_o}\right)^{\frac{k-1}{k}}\right]}$$

11. The method of claim 10, wherein said step of measuring flow passage pressure $P_i$ is done at a location in the converging portion of said flow passage that is upstream from said throat.

12. The method of claim 11, including the steps of measuring said stagnant pressure $P_o$ and said flow passage pressure $P_i$ and determining specific heat k on a real time basis.

13. The method of claim 12, including the steps of measuring density $\rho_o$ of said gas at said stagnant pressure $P_o$ and determining mass flow rate $\dot{m}$ on a real time basis.

14. The method of claim 11, wherein said step of measuring flow passage pressure $P_i$ is done at a location in the converging portion of said flow passage that is closer to said throat than to said entrance.

15. The method of claim 10, including the steps of measuring said stagnant pressure $P_o$, flow passage pressure $P_i$, and density $\rho_o$ at sequential time intervals while said gas is flowing and using said $P_o$, $P_i$, and $\rho_o$ measurements to determine specific heat k and mass flow rate $\dot{m}$ at sequential time intervals.

16. The method of claim 15, including the steps of determining mass m of gas that flows in each of the intervals by multiplying mass flow rate $\dot{m}$ determined for each time interval by the time elapsed in the time interval.

17. The method of claim 16, including the step of determining accumulated mass of gas that flows over an extended time period by adding the incremental mass determinations for each time interval in the extended time period.

18. A method of measuring mass flow rate of a flowing gas that varies in molecular composition, comprising the steps of:

determining specific heat ratio k of the gas;

determining mass flow rate $\dot{m}$ of the flowing gas as a function of the specific heat ratio k of the gas;

redetermining specific heat ratio k of the gas as molecular composition of the gas varies; and redetermining mass flow rate $\dot{m}$ of the flowing gas as a function of the redetermined specific heat ratio k of the gas.

19. The method of claim 18, including the steps of determining the specific heat ratio k by flowing the gas through a conduit that includes a nozzle which converges from a wider cross-section of said conduit to a narrower throat section such that there is a pressure differential between the gas in said conduit upstream of said nozzle and the gas in said nozzle resulting in a pressure upstream of said nozzle and a pressure in said nozzle, measuring the pressure upstream of said nozzle and the pressure in said nozzle, and determining said specific heat ratio of said gas as a function of the ratio of said pressure in said nozzle to the pressure upstream of the nozzle.

20. The method of claim 19, including the steps of flowing said gas through said nozzle under conditions of sonic velocity choked flow in said nozzle.

21. The method of claim 20, including the step of measuring said pressure in said nozzle upstream of said throat.

22. The method of claim 21, including the steps of measuring said pressure upstream of said nozzle under substantially stagnant condition.

23. The method of claim 22, including the step of measuring density of said gas at the stagnant pressure condition and determining the mass flow rate $\dot{m}$ as a function of said density, said ratio of pressure in the nozzle to pressure upstream of the nozzle, and said specific heat ratio k.

24. A method of determining specific heat ratio k of a gas, comprising the steps of flowing the gas through a conduit that includes a nozzle which converges from a wider cross-section of said conduit to a narrower throat section such that there is a pressure differential between the gas in said conduit upstream of said nozzle and the gas in said nozzle resulting in a pressure upstream of said nozzle and a pressure downstream of said nozzle; measuring the pressure upstream of said nozzle and the pressure in said nozzle and determining said specific heat ratio of said gas as a function of the ratio of said pressure in said nozzle to the pressure upstream of the nozzle.

25. The method of claim 24, including the steps of flowing said gas through said nozzle under conditions of sonic velocity choked flow in said nozzle.

26. The method of claim 25, including the step of measuring said pressure in said nozzle upstream of said throat.

27. The method of claim 26, including the steps of measuring said pressure upstream of said nozzle under substantially stagnant condition.

28. The method of claim 27, including the step of determining said specific heat ratio k of said gas according to relationships that can be expressed by the formula:

$$\sqrt{1-\left(\frac{P_i}{P_o}\right)^{\frac{k-1}{k}}} = \left[\frac{A_t}{A_i}\left(\frac{2}{k+1}\right)^{\frac{1}{k-1}}\sqrt{\frac{k-1}{k+1}}\right]\left(\frac{P_i}{P_o}\right)^{-\frac{1}{k}}$$

where $P_i$ is said pressure in said nozzle, $P_o$ is said pressure upstream of said nozzle, $A_t$ is the cross-sectional area of said throat section, and $A_i$ is the cross-sectional area of the nozzle at the location where said pressure $P_i$ in said nozzle is measured.

* * * * *